(12) United States Patent
Irioka et al.

(10) Patent No.: US 7,599,256 B2
(45) Date of Patent: Oct. 6, 2009

(54) METHOD AND APPARATUS FOR REPRODUCING INFORMATION FROM RECORDING MEDIUM

(75) Inventors: Shinji Irioka, Fukuoka-ken (JP); Hiroshi Nishiumi, Kanagawa-ken (JP); Yasuhiro Ueki, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 379 days.

(21) Appl. No.: 11/585,240

(22) Filed: Oct. 24, 2006

(65) Prior Publication Data

US 2007/0104062 A1 May 10, 2007

(30) Foreign Application Priority Data

Nov. 8, 2005 (JP) ............................. 2005-323042

(51) Int. Cl.
*G11B 21/08* (2006.01)
(52) U.S. Cl. .................................................. 369/30.1
(58) Field of Classification Search ................ 369/30.1, 369/116, 47.5–47.53, 13.26, 13.27
See application file for complete search history.

(56) References Cited

U.S. PATENT DOCUMENTS

| | | | | |
|---|---|---|---|---|
| 5,886,973 A | * | 3/1999 | Iida ............................. | 369/47.5 |
| 7,145,838 B2 | * | 12/2006 | Chu et al. .................... | 369/30.1 |
| 7,457,215 B2 | * | 11/2008 | Kuwahara et al. .......... | 369/47.53 |
| 2002/0012301 A1 | * | 1/2002 | Kanno et al. ............... | 369/47.51 |
| 2002/0031060 A1 | * | 3/2002 | Mashimo et al. ........... | 369/44.29 |
| 2005/0030863 A1 | * | 2/2005 | Masui ......................... | 369/47.53 |
| 2005/0105418 A1 | * | 5/2005 | Kuwahara et al. ........... | 369/47.5 |
| 2005/0141363 A1 | * | 6/2005 | Shimamoto et al. ........ | 369/44.29 |
| 2006/0062098 A1 | * | 3/2006 | Miyake et al. .............. | 369/44.11 |
| 2006/0077882 A1 | * | 4/2006 | Lee et al. .................... | 369/275.1 |

FOREIGN PATENT DOCUMENTS

| | | |
|---|---|---|
| JP | 8-203107 | 8/1996 |
| JP | 10-011774 | 1/1998 |

\* cited by examiner

*Primary Examiner*—Wayne R Young
*Assistant Examiner*—Brenda Bernardi
(74) *Attorney, Agent, or Firm*—Louis Woo (57) ABSTRACT

One of (1) a signal reproduced from a recording medium by a pickup device and (2) control information related to the reproduced signal is searched in a first search range for first information. A trial is made for detecting an optimum condition of a reproducing operation of the pickup device with respect to the recording medium on the basis of the first information. In cases where detecting an optimum condition of the reproducing operation of the pickup device with respect to the recording medium on the basis of the first information has been unsuccessful, one of (1) the reproduced signal and (2) the control information related to the reproduced signal is searched in a second search range different from the first search range for second information. An optimum condition of the reproducing operation of the pickup device is detected on the basis of the second information.

8 Claims, 5 Drawing Sheets

METHOD AND APPARATUS FOR REPRODUCING INFORMATION FROM RECORDING MEDIUM

BACKGROUND OF THE INVENTION

1. Field of the Invention

This invention generally relates to a method and an apparatus for reproducing information from a recording medium. This invention particularly relates to a method and an apparatus for performing automatic or manual adjustments to the frequency response of a signal transmission system, and a gain, a balance, and an offset about a tracking error signal or a focusing error signal with respect to a disc-shaped removal recording medium, and reproducing information therefrom.

2. Description of the Related Art

A typical optical-disc drive apparatus includes an optical head for optically recording and reproducing information on and from an optical disc through the use of a writing laser beam applied to the optical disc and a reading laser beam returned therefrom. The drive apparatus performs tracking control and focusing control of the optical head relative to the optical disc to accurately write and read data into and from the optical disc. The drive apparatus includes servo control circuits for adjusting the optical head to implement the tracking control and the focusing control.

In general, during the recording of information on a recordable optical disc, the power of a writing laser beam focused on the optical disc is adjusted to a level specified by the optical disc. During the reproduction of information from the optical disc, a reading laser beam is optimized by the following steps. Gains related to a tracking error signal and a focusing error signal are changed. Each time the gain change is performed, offsets about the tracking error signal and the focusing error signal are adjusted. Furthermore, balances about the tracking error signal and the focusing error signal are adjusted. The gains, the offsets, and the balances about the tracking error signal and the focusing error signal are set to optimum values.

A physical change in use environments such as an ageing-based change, a temperature change, a humidity change, or a power-supply-voltage change causes the gains, the offsets, and the balances to deviate from the optimum values. In this case, it is necessary to readjust the gains, the offsets, and the balances.

Japanese patent application publication number 8-203107/1996 discloses an apparatus for recording and reproducing information on and from an optical disc. The apparatus in Japanese application 8-203107/1996 includes an optical head for applying a laser beam to the optical disc. The apparatus detects the current value of a physical condition of the apparatus or an optical disc, and compares the current detected value with a reference value or the immediately-preceding detected value of the physical condition. The apparatus decides whether or not the optical head is in a stand-by state or an active state with respect to the optical disc. In the case where the current detected value of the physical condition exceeds the reference value or differs from the immediately-preceding detected value thereof by a prescribed value or more, when the optical head is in its stand-by state, the apparatus optimizes at least one of the tracking control and the focusing control of the laser beam with respect to the optical disc.

In the apparatus of Japanese application 8-203107/1996, at least one of an offset, a balance, and a gain about a tracking error signal or a focusing error signal is readjusted so as to follow a variation in the physical condition of the optical disc. Accordingly, the tracking control or the focusing control remains optimized while the physical condition of the optical disc varies.

Removal recording discs include DVDs (digital versatile discs) which are of various types such as a DVD-Video, a DVD-ROM, a DVD-R, a DVD-RW, a DVD-RAM, a DVD+R, a DVD+RW, and an HD-DVD. These DVDs are prescribed by the different standards, respectively. There are optical-disc drive apparatuses which can handle DVDs of plural types. An ideal super multi-drive apparatus can handle DVDs of all the types. When being loaded with a DVD, such a super multi-drive apparatus detects the type of the DVD and adjusts servo and signal-transmission systems therein to states optimum for the detected DVD type. After the DVD type detection and the adjustment of the servo and signal-transmission system are completed, the super multi-drive apparatus starts to, for example, play back the DVD. In general, the DVD type detection and the adjustment of the servo and signal-transmission system take a long time. Accordingly, there will be a long wait until the start of the playback of the DVD.

Some of commercially available DVDs have physical characteristics out of the standards. In some cases, such DVDs can not be played back by normal drive apparatuses.

Japanese patent application publication number 10-11774/1998 discloses an apparatus for reproducing information from an optical disc. The apparatus in Japanese application 10-11774/1998 includes a motor for rotating the optical disc, and an optical head for applying a laser beam to the optical disc. The optical head has sensors for receiving laser light returned from the optical disc. A tracking error signal is generated by calculations using the output signals from the sensors. The optical head is controlled in response to the tracking error signal so as to be properly located with respect to the track on the optical disc. A focusing error signal is generated by calculations using the output signals from the sensors. A focusing servo control device controls the optical head in response to the focusing error signal so as to properly locate the optical head in the focusing direction with respect to the optical disc.

In the apparatus of Japanese application 10-11774/1998, the optical head converts received laser light from the optical disc into an electric signal and outputs the electric signal. A demodulator subjects the output signal from the optical head to demodulation, thereby recovering original information therefrom and generating a reproduced signal. The focusing servo control device is in a control loop having an adjustable gain. A disturbance signal of a specified frequency is applied to the control loop. Signals occurring in the control loop before and after the application of the disturbance signal are compared. The gain of the control loop is optimized in response to the result of the signal comparison. A condition of the reproduced signal is measured synchronously with the disturbance signal. The function of the focusing servo control device to properly locate the optical head in the focusing direction is optimized in response to the measured condition of the reproduced signal.

SUMMARY OF THE INVENTION

It is a first object of this invention to provide a method of reproducing information from a removable recording medium having poor physical characteristics as well as a removable recording medium having good physical characteristics.

It is a second object of this invention to provide an apparatus for reproducing information from a removable recording medium having poor physical characteristics as well as a removable recording medium having good physical characteristics.

A first aspect of this invention provides a method of reproducing an information signal from a removable recording medium by using a pickup device. The method comprises the steps of searching one of (1) a reproduced signal reproduced from the recording medium by the pickup device and (2) control information related to the reproduced signal in a first search range for first information; detecting an optimum condition of a reproducing operation of the pickup device with respect to the recording medium on the basis of the first information; deciding whether or not detecting an optimum condition of the reproducing operation of the pickup device with respect to the recording medium on the basis of the first information has been successful; searching one of (1) the reproduced signal and (2) the control information related to the reproduced signal in a second search range different from the first search range for second information in cases where it is decided that detecting an optimum condition of the reproducing operation of the pickup device with respect to the recording medium on the basis of the first information has not been successful; and detecting an optimum condition of the reproducing operation of the pickup device with respect to the recording medium on the basis of the second information.

A second aspect of this invention is based on the first aspect thereof, and provides a method wherein the second information corresponds to at least one arbitrarily selected from predetermined parameters.

A third aspect of this invention is based on the first aspect thereof, and provides a method further comprising the steps of reproducing from the recording medium an information piece representing a manufacturer of the recording medium, an information piece representing the designing of the recording medium, an information piece representing physical characteristics of the recording medium, an information piece representing a date of production of the recording medium, and an information piece representing a domain where the recording medium is made; and deciding the second search range on the basis of at least one of the information pieces reproduced from the recording medium.

A fourth aspect of this invention is based on the first aspect thereof, and provides a method further comprising the steps of reproducing from the recording medium an information piece representing a history of recording with respect to the recording medium, an information piece representing a recording format, an information piece representing a recording apparatus, an information piece representing a date of recording, an information piece representing physical characteristics of the recording medium, an information piece representing a domain where recording is done, and an information piece representing conditions of recording; and deciding the second search range on the basis of at least one of the information pieces reproduced from the recording medium.

A fifth aspect of this invention is based on the first aspect thereof, and provides a method further comprising the steps of sending an information request signal to a server via a communication line; receiving third information from the server via the communication line as a response to the information request signal, the third information relating to signal reproduction from the recording medium; and deciding the second search range on the basis of the received third information.

A sixth aspect of this invention provides an apparatus for reproducing an information signal from a removable recording medium by using a pickup device. The apparatus comprises means for searching one of (1) a reproduced signal reproduced from the recording medium by the pickup device and (2) control information related to the reproduced signal in a first search range for first information; means for detecting an optimum condition of a reproducing operation of the pickup device with respect to the recording medium on the basis of the first information; means for deciding whether or not detecting an optimum condition of the reproducing operation of the pickup device with respect to the recording medium on the basis of the first information has been successful; means for searching one of (1) the reproduced signal and (2) the control information related to the reproduced signal in a second search range different from the first search range for second information in cases where it is decided that detecting an optimum condition of the reproducing operation of the pickup device with respect to the recording medium on the basis of the first information has not been successful; and means for detecting an optimum condition of the reproducing operation of the pickup device with respect to the recording medium on the basis of the second information.

A seventh aspect of this invention is based on the sixth aspect thereof, and provides an apparatus wherein the second information corresponds to at least one arbitrarily selected from predetermined parameters.

An eighth aspect of this invention is based on the sixth aspect thereof, and provides an apparatus further comprising means for reproducing from the recording medium an information piece representing a manufacturer of the recording medium, an information piece representing the designing of the recording medium, an information piece representing physical characteristics of the recording medium, an information piece representing a date of production of the recording medium, and an information piece representing a domain where the recording medium is made; and means for deciding the second search range on the basis of at least one of the information pieces reproduced from the recording medium.

A ninth aspect of this invention is based on the sixth aspect thereof, and provides an apparatus further comprising means for reproducing from the recording medium an information piece representing a history of recording with respect to the recording medium, an information piece representing a recording format, an information piece representing a recording apparatus, an information piece representing a date of recording, an information piece representing physical characteristics of the recording medium, an information piece representing a domain where recording is done, and an information piece representing conditions of recording; and means for deciding the second search range on the basis of at least one of the information pieces reproduced from the recording medium.

A tenth aspect of this invention is based on the sixth aspect thereof, and provides an apparatus further comprising means for sending an information request signal to a server via a communication line; means for receiving third information from the server via the communication line as a response to the information request signal, the third information relating to signal reproduction from the recording medium; and means for deciding the second search range on the basis of the received third information.

An eleventh aspect of this invention provides an apparatus for use with a laser-scanned optical disc which comprises first means for applying a forward laser beam to the optical disc; second means for receiving return laser light caused by reflection of the forward laser beam at the optical disc, and converting the received return laser light into an electric signal; third means for detecting a quality of the electric signal; fourth means for varying a condition of the forward laser beam relative to the optical disc in at least a portion of a first range; fifth means for monitoring the quality detected by the third means while the fourth means varies the condition of the forward laser beam, for detecting when the quality detected by the third means becomes optimum, and for detecting the condition of the forward laser beam which occurs when the quality detected by the third means becomes optimum; sixth means for deciding whether or not the fifth means successfully detects when the quality detected by the third means becomes optimum; seventh means for varying the condition of the forward laser beam relative to the optical disc in at least a portion of a second range different from the first range after the sixth means decides that the fifth means does not successfully detect when the quality detected by the third means becomes optimum; and eighth means for monitoring the quality detected by the third means while the seventh means varies the condition of the forward laser beam, for detecting when the quality detected by the third means becomes optimum, and for detecting the condition of the forward laser beam which occurs when the quality detected by the third means becomes optimum.

A twelfth aspect of this invention is based on the eleventh aspect thereof, and provides an apparatus wherein the condition of the forward laser beam is a focusing condition of the forward laser beam.

This invention has advantages explained below. In the case where the recording medium has good characteristics, the optimization is performed on the basis of the first information obtained by the search in the first search range, and thereby the pickup device normally obtains the reproduced signal. When the reproduced signal is not normally obtained, it is decided that the recording medium has poor characteristics. In this case, the optimization is performed on the basis of the second information obtained by the search in the second search range different from the first search range. Therefore, an information signal can be normally reproduced from the poor-characteristic recording medium at a higher probability. Furthermore, the optimization can be performed in a short time for the good-characteristic recording medium. Thus, an information signal can be promptly reproduced from the good-characteristic recording medium.

In the event that signal reproduction from the recording medium fails, the first search range is replaced by the second search range and the optimization is performed. Therefore, although there may be a variation in characteristics of future recording mediums, information signals can be reproduced from the future recording mediums at high probabilities.

DETAILED DESCRIPTION OF THE INVENTION

FIRST EMBODIMENT

Figure 1:
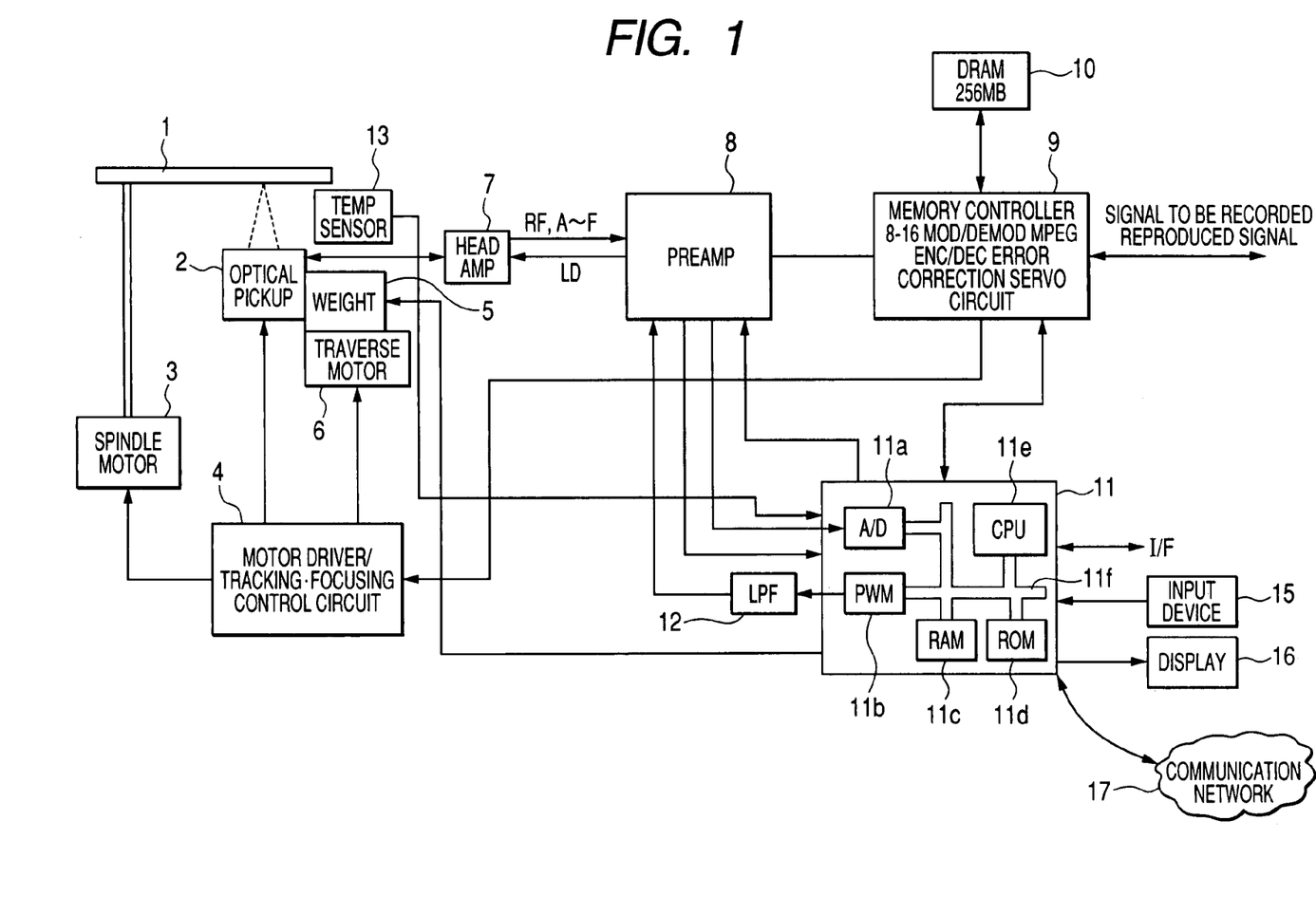
FIG. 1 is a block diagram of an information recording and reproducing apparatus including an optical-disc drive apparatus according to a first embodiment of this invention.

FIG. 1 shows an information recording and reproducing apparatus including an optical-disc drive apparatus according to a first embodiment of this invention.

The apparatus of FIG. 1 has a body into and from which an optical disc 1 can be inserted and ejected. Thus, the optical disc 1 is removable. The optical disc 1 is, for example, a DVD. The apparatus includes an optical pickup (an optical head) 2 for applying a forward laser beam to the optical disc 1 in position, and receiving return laser light from the optical disc 1 which is caused by the reflection of the forward laser beam at the optical disc 1. The optical pickup 2 focuses the forward laser beam into a spot on the optical disc 1.

During a recording mode of operation of the apparatus, the forward laser beam is modulated in accordance with information to be recorded which includes at least one of bibliographic information, audio information, and video information. The forward laser beam scans the optical disc 1 so that the information is recorded thereon. The recorded information is in a prescribed format.

During a reproducing mode (a playback mode) of operation of the apparatus, the optical pickup 2 applies a forward laser beam to the optical disc 1 and receives reflected laser light from the optical disc 1 which carries the recorded information thereon. The optical pickup 2 converts the received laser light into an electric signal containing the recorded information. Thus, the information is reproduced from the optical disc 1.

During the recording or reproducing mode of operation of the apparatus, the optical pickup 2 converts the received reflected laser light into a reproduced signal. The reproduced signal is transmitted from the optical pickup 2 to a servo circuit in a block 9 through a head amplifier 7 and a preamplifier 8. The servo circuit controls a motor driver/ tracking-focusing control circuit 4 connected to a spindle motor 3 in response to the reproduced signal, thereby implementing servo control so that the optical disc 1 will be rotated by the spindle motor 3 on a CLV (constant linear velocity) basis.

The optical pickup 2 is provided with a weight or a superimposer 5. The optical pickup 2 can be moved by a traverse motor 6 in a radial direction with respect to the optical disc 1. The optical pickup 2 includes a laser diode for emitting a laser beam, and an optical system for focusing the emitted laser beam into a spot on the optical disc 1. The optical pickup 2 further includes photodetectors for receiving portions of reflected laser light from the optical disc 1, and changing the received light portions into corresponding electric signals through photoelectric conversion. The optical pickup 2 generates a reproduced signal RF (a data-representing reproduced RF signal), focusing-error detecting signals A, B, C, and D of four types, and tracking-error detecting signals E and F of two types from the received light portions in a conventional way. The reproduced signal RF contains the recorded information on the optical disc 1. The focusing-error detecting signals A, B, C, and D are based on a conventional astigmatism method. The tracking-error detecting signals E and F are based on a conventional three-beam method. The optical pickup 2 outputs the signals RF and A-F to the head amplifier 7.

The head amplifier 7 amplifies the signals RF and A-F with frequency responses assigned to the respective signals RF and A-F. The head amplifier 7 outputs the amplified signals RF and A-F to the preamplifier 8. The head amplifier 7 receives, from the preamplifier 8, a signal LD for driving the laser diode in the optical pickup 2. The head amplifier 7 passes the signal LD to the laser diode in the optical pickup 2.

A temperature sensor 13 is located near the optical pickup 2. The temperature sensor 13 detects the temperature of an atmosphere around the optical pickup 2, and generates a signal representative thereof. The temperature sensor 13 outputs the generated signal to an A/D converter (an analog-to-digital converter) 11a within a microcomputer 11. Under the control by a CPU (central processing unit) 11e within the microcomputer 11, the A/D converter 11a repetitively changes the output signal of the temperature sensor 13 into a corresponding digital temperature signal, and the digital temperature signal is written into a RAM 11c within the microcomputer 11 on a real-time basis.

The CPU 11e may operate to compare the detected temperature represented by the current digital temperature signal in the RAM 11c with a reference temperature (a prescribed temperature) or the detected temperature represented by the immediately-preceding digital temperature signal. When the detected temperature represented by the current digital temperature signal is equal to or higher than the prescribed temperature, or when the current detected temperature differs from the immediately-preceding detected temperature by a threshold value or more, the CPU 11e may implement an optimization process explained later.

The preamplifier 8 reproduces encoded data (an EFM signal) from the signal RF. The preamplifier 8 includes a circuit for generating a focusing error signal from the signals A-D. The preamplifier 8 further includes a circuit for generating a tracking error signal from the signals E and F. The preamplifier 8 outputs the reproduced encoded data (the EFM signal), the focusing error signal, and the tracking error signal to the block 9.

The preamplifier 8 passes the signals A-F to the microcomputer 11. The preamplifier 8 outputs the focusing error signal and the tracking error signal to the microcomputer 11. The preamplifier 8 includes an envelope detection circuit for detecting the envelope of the EFM signal (or the reproduced signal RF) and generating a signal having a voltage representative of the detected envelope. The generated signal is called the envelope signal. The preamplifier 8 outputs the envelope signal to the microcomputer 11.

The block 9 includes a memory controller, an 8-16 modulator/demodulator, an MPEG encoder/decoder, an error correction circuit, and a servo circuit. The servo circuit is formed by, for example, a DSP (digital signal processor).

A dynamic random access memory (DRAM) 10 connected to the block 9 has a capacity of, for example, 256 MB. The DRAM 10 operates to temporarily store data which occurs data compression and data expansion during the recording and reproducing modes of operation of the apparatus. Writing and reading data into and from the DRAM 10 are controlled by the memory controller within the block 9 in accordance with instructions from the microcomputer 11.

During the recording mode of operation of the apparatus, data to be recorded is encoded and modulated by the MPEG encoder and the 8-16 modulator within the block 9, and the resultant data is transmitted from the block 9 to the optical pickup 2 through the preamplifier 8 and the head amplifier 7.

During the reproducing mode of operation of the apparatus, the servo circuit within the block 9 controls the optical pickup 2 via the motor driver/tracking-focusing control circuit 4 in response to the focusing error signal and the tracking error signal from the preamplifier 8 so that the forward laser beam emitted from the optical pickup 2 will follow the track on the optical disc 1 while remaining focused thereon. The focusing error signal propagates from the servo circuit within the block 9 to the weight 5 on the optical pickup 2 through the motor driver/ tracking-focusing control circuit 4.

The servo circuit within the block 9 includes a focusing servo circuit and a tracking servo circuit for focusing servo control and tracking servo control respectively. The focusing servo circuit controls the position of an objective lens within the optical pickup 2 in the axial direction (the direction of the axis of the forward laser beam) via the motor driver/ tracking-focusing control circuit 4 in response to the focusing error signal so that the diameter of the spot of the forward laser beam on the optical disc 1 will continue to be minimized. Thus, the focusing servo control is implemented. The tracking servo circuit controls the optical pickup 2 via the motor driver/tracking-focusing control circuit 4 and the traverse motor 6 in response to the tracking error signal so that the position of the spot of the forward laser beam on the optical disc 1 will be adjusted in the track width-wise direction (the radial direction with respect to the optical disc 1) and the spot will follow the track on the optical disc 1. Thus, the tracking servo control is implemented.

During the recording mode of operation of the apparatus, the microcomputer 11 controls the servo circuit within the block 9 to move the optical pickup 2 to a position aligned with an innermost part of the optical disc 1 where a TOC (table of contents) or a UTOC (user table of contents) inclusive of disc ID information is stored, and the optical pickup 2 reads out the ID information from the optical disc 1. The read-out ID information is transmitted from the optical pickup 2 to the microcomputer 11 via the head amplifier 7, the preamplifier 8, and the block 9. The microcomputer 11 operates to adjust an offset and a balance about the tracking error signal in response to the ID information.

The microcomputer 11 includes the A/D converter 11a, a PWM (pulse-width modulation) section 11b, a random-access memory (RAM) 11c, a read-only memory (ROM) 11d, the CPU 11e, and a D/A converter (not shown) which are mutually connected by a bus 11f. The D/A converter is short for the digital-to-analog converter. The A/D converter 11a receives the signals A-F, the focusing error signal, the tracking error signal, and the envelope signal from the preamplifier 8, and converts the received signals into digital signals handled within the microcomputer 11. The PWM section 11b generates and outputs a power control signal designed so that the power of the forward laser beam emitted from the laser diode within the optical pickup 2 will be controlled while the laser diode will be driven by a signal corresponding to, for example, a 12-bit PWM signal. The RAM 11c provides a work area. The ROM 11d stores a control program for the CPU 11e or the microcomputer 11. The microcomputer 11 can be connected to a communication network 17 such as the Internet through an interface (not shown).

The RAM 11c has an area for storing data representing the upper and lower peaks of the tracking error signal which are used in an adjustment implemented by the CPU 11e as will be mentioned later. The PWM section 11b outputs a PWM signal to a low pass filter (LPF) 12 as the power control signal. The LPF 12 converts the PWM signal into a DC voltage. The LPF 12 outputs the DC voltage to the preamplifier 8. The DC voltage is sent from the preamplifier 8 to the laser diode within the optical pickup 2. The DC voltage drives the laser diode. The power of the forward laser beam emitted from the laser diode depends on the DC voltage.

The microcomputer 11 includes interfaces (not shown) connected with an input device 15 and a display 16. A user can input instructions into the microcomputer 11 by operating the input device 15. The microcomputer 11 controls the display 16 to indicate the state of information recording, the state of information reproduction, and the state of control.

Normally, a PLL (phase-locked loop) in the servo circuit within the block 9 responds to the reproduced encoded data from the preamplifier 8, and generates a signal having a frequency depending on the relative speed between the optical disc 1 and the spot of the forward laser beam on the optical disc 1. The PLL outputs the generated speed signal to the motor driver/tracking-focusing control circuit 4. The motor driver/tracking-focusing control circuit 4 controls the spindle motor 3 in response to the speed signal so that the optical disc 1 will be rotated on a CLV basis. Accordingly, the rotation of the optical disc 1 is subjected to feedback control for CLV.

During the reproducing mode of operation of the apparatus, the microcomputer 11 implements an optimization process.

In a first stage of the optimization process, the microcomputer 11 deactivates the PLL in the servo circuit within the block 9 and controls the servo circuit to output a fixed-speed signal to the motor driver/tracking-focusing control circuit 4. The motor driver/tracking-focusing control circuit 4 controls the spindle motor 3 in response to the fixed-speed signal so that the optical disc 1 will be rotated at a prescribed speed determined by the fixed-speed signal.

In the first stage of the optimization process, the microcomputer 11 controls the tracking servo circuit and the focusing servo circuit within the block 9 to deactivate the tracking servo control and the focusing servo control. Furthermore, the microcomputer 11 nullifies the power of the forward laser beam emitted from the laser diode within the optical pickup 2. In other words, the microcomputer 11 deactivates the laser diode. Under these conditions, the CPU 11e controls the A/D converter 11a to repetitively sample the tracking error signal and the focusing error signal from the preamplifier 8 and to repetitively convert the resultant samples into corresponding digital samples. The CPU 11e accepts the digital samples, and measures the voltages of the tracking error signal and the focusing error signal by referring to the accepted digital samples. The CPU 11e calculates the difference between the measured voltage of the tracking error signal and a reference voltage for the tracking error signal. The CPU 11e calculates the difference between the measured voltage of the focusing error signal and a reference voltage for the focusing error signal. The microcomputer 11 generates a tracking offset voltage designed to nullify the calculated tracking-related difference. In addition, the microcomputer 11 generates a focusing offset voltage designed to nullify the calculated focusing-related difference. The microcomputer 11 outputs the tracking offset voltage and the focusing offset voltage.

In a second stage of the optimization process, the microcomputer 11 activates the laser diode within the optical pickup 2, and controls the tracking servo circuit and the focusing servo circuit within the block 9 to activate the tracking servo control and the focusing servo control. For an adjustment to a focusing balance, the CPU 11e controls the A/D converter 11a to repetitively sample the envelope signal from the preamplifier 8 and to convert every resultant sample into a corresponding digital sample. The CPU 11e accepts the digital sample, and measures the voltage of the envelope signal by referring to the accepted digital sample. The microcomputer 11 operates to move the focus position of the forward laser beam back and forth (or linearly) in the axial direction and monitors the measured voltage of the envelope signal to implement optimization of laser-beam focusing.

During the focusing optimization, the microcomputer 11 repetitively generates a focusing vibration signal. The microcomputer 11 feeds the focusing vibration signal to the weight 5 on the optical pickup 2. Preferably, the focusing vibration signal is outputted from the D/A converter within the microcomputer 11. The weight (superimposer) 5 superimposes the focusing error signal and the focusing vibration signal to generate a superimposition-result signal. The optical pickup 2 includes a focusing drive section for moving the objective lens within the optical pickup 2 along the direction of the optical axis (the direction of the travel of the forward laser beam). The superimposition-result signal is applied to the focusing drive section so that the objective lens will reciprocate in the direction of the optical axis at a period equal to that of the focusing vibration signal and within a range (a search range) determined by the focusing servo. Accordingly, the focus position of the forward laser beam periodically moves back and forth within a range (a search range) in accordance with the focusing vibration signal. The amplitudes of the signal RF and the EFM signal and the jitters of the RF signal and the EFM signal vary as the focus position of the forward laser beam moves in this manner. It should be noted that the focusing vibration signal may be designed to move the focus position of the forward laser beam in the search range.

During the focusing optimization, the envelope detection circuit in the preamplifier 8 detects the envelope of the EFM signal (or the signal RF) and generates an envelope signal having a voltage representative of the detected envelope. The envelope detection circuit detects the absolute value in voltage of the EFM signal (or the signal RF) and generates a signal representative thereof, and extracts low-frequency components from the resultant absolute-value signal to get the envelope signal. The preamplifier 8 outputs the envelope signal to the A/D converter 11a within the microcomputer 11. The A/D converter 11a repetitively samples the envelope signal, and converts every resultant sample into a corresponding digital sample handled within the microcomputer 11. For example, the A/D converter 11a iterates the sampling 256 times for every feed of the focusing vibration signal to the weight 5, and the microcomputer 11 iterates the feed of the focusing vibration signal 16 times. These iterations prevent the focusing optimizing control from being adversely affected by a defect, a surface curvature, and an eccentricity in the optical disc 1, and a recorded signal difference.

There may be a known jitter detector for measuring the jitter of the signal RF or the EFM signal in the preamplifier 8. In this case, the jitter detector informs the microcomputer 11 of the measured jitter of the signal RF or the EFM signal.

During the focusing optimization, the CPU 11e measures the voltage of the envelope signal by referring to every digital sample thereof. For digital samples occurring when the focus position deviates in a positive side from the center, the CPU 11e computes an arithmetical mean value of the corresponding measured voltages of the envelope signal. For digital samples occurring when the focus position deviates in a negative side from the center, the CPU 11e computes an arithmetical mean value of the corresponding measured voltages of the envelope signal. The CPU 11e compares the computed positive-focus and negative-focus mean values to calculate the difference therebetween. The CPU 11e detects the amplitude of the EFM signal (or the signal RF) by referring to every measured voltage of the envelope signal. The measured jitter of the EFM signal (or the signal RF) may be used instead of the detected amplitude thereof. The CPU 11e recognizes the relation between the focus position and the detected amplitude of the EFM signal (or the measured jitter of the EFM signal) on the basis of the focusing vibration signal. The CPU 11e detects the focus position at which the detected amplitude of the EFM signal (or the signal RF) is maximized or the measured jitter of the EFM signal (or the signal RF) is minimized provided that the difference between the computed positive-focus and negative-focus mean values is within a prescribed range. The CPU 11e labels the detected focus position as optimum one.

In a third stage of the optimization process which follows the focusing optimization, an adjustment to a tracking balance is performed as mentioned hereafter. The microcomputer 11 controls the tracking servo circuit within the block 9 to deactivate the tracking servo control. The microcomputer 11 measures the upper and lower peak values of the S curve of the tracking error signal. The microcomputer 11 calculates the absolute values of the measured upper and lower peak values, and the difference between the calculated absolute values. The microcomputer 11 generates a tracking balance signal in response to the absolute-value difference. The microcomputer 11 feeds the generated tracking balance signal to the tracking-error-signal generating circuit within the preamplifier 8, thereby controlling the tracking balance so as to equalize the calculated absolute values. Preferably, the tracking balance signal is outputted from the D/A converter within the microcomputer 11. The microcomputer 11 generates a tracking gain signal in response to the measured upper and lower peak values. The microcomputer 11 feeds the generated tracking gain signal to the tracking-error-signal generating circuit within the preamplifier 8, thereby controlling a tracking gain. Preferably, the tracking gain signal is outputted from the D/A converter within the microcomputer 11.

Thereafter, the microcomputer 11 controls the tracking servo circuit within the block 9 to activate the tracking servo control. Then, the microcomputer 11 properly adjusts a gain about the EFM signal in the preamplifier 8 in response to the envelope of the EFM signal. The microcomputer 11 generates a focusing gain signal. The microcomputer 11 controls a focusing gain through the use of the focusing gain signal in a way similar to the above-mentioned control of the tracking gain.

Figure 2:
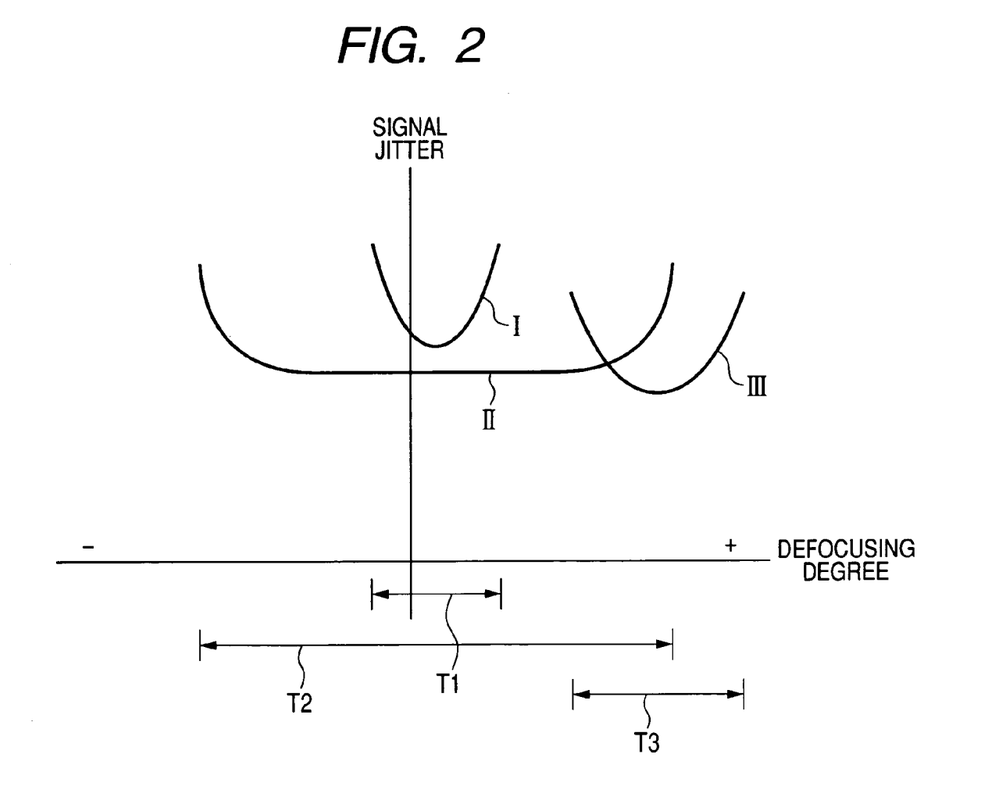
FIG. 2 is a diagram showing examples of the relation between the reproduced-signal jitter and the defocusing degree.

In the case where the optical disc 1 meets values (a disc thickness, a refractive index, a jitter, and an error rate) prescribed by at least important portions of the DVD standards, the measured jitter of the signal RF (or the EFM signal) occurring in the presence of the focusing vibration signal fed to the weight 5 takes a characteristic curve I in FIG. 2 which has a sharp dip and a clear minimum. In this case, a first focusing optimizer detects the focus position (the defocusing degree or the position of the objective lens in the axial direction) in a narrow search range T1 at which the measured jitter of the signal RF (or the EFM signal) is minimized or the detected amplitude thereof is maximized. The first focusing optimizer labels the detected focus position as optimum one. The first focusing optimizer is implemented mainly by the microcomputer 11.

As previously mentioned, there may be a known jitter detector. An example of the jitter detector includes a PLL for generating a clock signal from the signal RF (or the EFM signal), a wave shaper for converting the signal RF (or the EFM signal) into a binary signal, a difference detector for detecting the time differences between rising edges of the clock signal and the binary signal and the time differences between falling edges thereof, an integrator for integrating and averaging the detected time differences to obtain an integrating/ averaging-result value, a divider for dividing the integrating/averaging-result value by the period of the clock signal to obtain a division-result value, and a multiplier for multiplying the division-result value by 100 to obtain a jitter.

The jitter detector informs the microcomputer 11 of the obtained jitter. The microcomputer 11 may form at least part of the jitter detector. As the jitter of the signal RF (or the EFM signal) is smaller, the quality thereof is better. As a focusing error increases, the spot of the forward laser beam on the optical disc 1 widens and the S/N (signal-to-noise) ratio of the signal RF or the EFM signal drops. Specifically, as the focusing error increases, the amplitude of the signal RF (or the EFM signal) decreases and the jitter thereof increases. When the focusing error is great, the characteristic curve of the jitter tends to be dull and lose a sharp dip and a clear minimum.

In the case where the optical disc 1 does not meet values (a disc thickness, a refractive index, a jitter, and an error rate) prescribed by important portions of the DVD standards, the measured jitter of the signal RF (or the EFM signal) occurring in the presence of the focusing vibration signal fed to the weight 5 takes a characteristic curve II or III in FIG. 2 which has an obtuse dip and a unclear minimum. In this case, a second focusing optimizer detects the focus position (the defocusing degree or the axial-direction position of the objective lens) in a wide search range T2 or T3 at which the measured jitter of the signal RF (or the EFM signal) is minimized or the detected amplitude thereof is maximized. The search ranges T2 and T3 are tuned to the characteristic curves II and III, respectively. The search range T2 is greater than the search range T3. The search range T3 is greater than the search range T1. The search range T3 positionally differs from the search range T1. The second focusing optimizer labels the detected focus position as optimum one. The second focusing optimizer is implemented mainly by the microcomputer 11.

The first focusing optimizer is given a higher priority in comparison with the second focusing optimizer. When the first focusing optimizer fails to detect the focus position in the search range T1 at which the measured jitter of the signal RF (or the EFM signal) is minimized or the detected amplitude thereof is maximized, the second focusing optimizer is activated. In this case, for the characteristic curve II of the jitter, the second focusing optimizer uses the search range T2 wider than the search range T1 and tries to detect the focus position in the search range T2 at which the measured jitter of the signal RF (or the EFM signal) is minimized or the detected amplitude thereof is maximized. For the characteristic curve III of the jitter, the second focusing optimizer uses the search range T3 positionally different from and wider than the search range T1 and tries to detect the focus position in the search range T3 at which the measured jitter of the signal RF (or the EFM signal) is minimized or the detected amplitude thereof is maximized.

Specifically, setting or selection of a search range used by the second focusing optimizer is responsive to the measured values (the measured jitters or the detected amplitudes of the signal RF or the EFM signal) obtained by the first focusing optimizer for the search range T1. When the measured values obtained by the first focusing optimizer for the search range T1 exhibit a variation in a positive-going defocusing-degree direction and a variation in a negative-going defocusing-degree direction which are smaller than a prescribed value, the search range T1 is expanded to the search range T2 and the second focusing optimizer uses the search range T2. When the measured values obtained by the first focusing optimizer for the search range T1 suggest that a minimum point exists in a positive-going side of the search range T1, the search range T1 is shifted rightward and expanded to the search range T3 and the second focusing optimizer uses the search range T3.

Figures 3, 4:
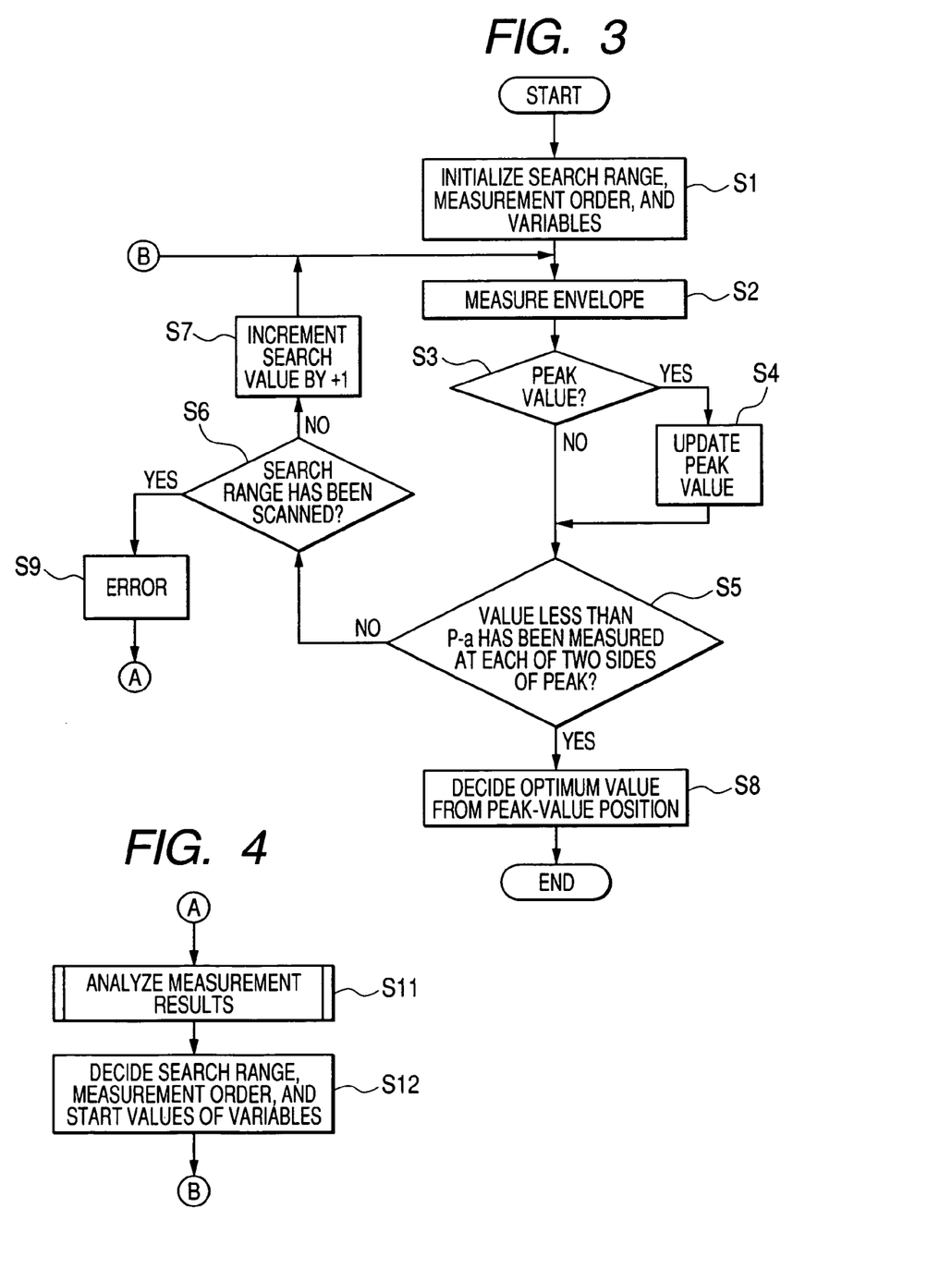
FIGS. 3 and 4 are a flowchart of a segment of a control program for a CPU or a microcomputer in FIG. 1.

FIGS. 3 and 4 show a flowchart of a segment of the control program for the CPU 11e or the microcomputer 11. As shown in FIG. 3, a first step S1 of the program segment initializes a search range for focusing optimization. The step S1 further initializes variables representing a focus position, a measured peak value (P), and a measurement sampling order. Data indicating an optimum value for focusing at the time of the production of an optical disc 1 is stored in the ROM 11*d* in advance. The step S1 retrieves the optimum value for focusing from the ROM 11*d*, and labels the retrieved optimum value as an initial focus position. The step S1 decides a search value in accordance with the initial focus position. The step S1 generates the focusing vibration signal in response to the search value, and feeds the generated focusing vibration signal to the weight 5. The search range and the measurement sampling order set by the step S1 are those for the previously-mentioned first focusing optimizer. After the step S1, the program advances to a step S2.

In the case where the optical disc 1 properly conforms to the DVD standards, the measured jitter of the signal RF (or the EFM signal) occurring in the presence of the focusing vibration signal fed to the weight 5 takes the characteristic curve I of FIG. 2. The initial search range is same as that denoted by T1 in FIG. 2. Thus, the initial search range is relatively narrow.

The step S2 samples the envelope signal from the preamplifier 8, and measures the value of the resultant sample. The sampling is implemented by the A/D converter 11*a*. The step S2 stores data representative of the measured value into the RAM 11*c*.

A step S3 following the step S2 decides whether or not the current measured value corresponds to a peak value. Specifically, the step S3 retrieves the immediately-preceding measured value from the RAM 11*c*. The step S3 determines whether or not the current measured value is greater than the immediately-preceding measured value. When the current measured value is greater than the immediately-preceding measured value, the step S3 decides that the current measured value corresponds to a peak value. In this case, the program advances from the step S3 to a step S4. On the other hand, when the current measured value is not greater than the immediately-preceding measured value, the program advances from the step S3 to a step S5.

The step S4 updates the measured peak value (P) to the current measured value. After the step S4, the program advances to the step S5.

The step S5 subtracts a prescribed value "a" from the measured peak value P to obtain a subtraction result "P−a". The step S5 decides whether or not the current measured value is smaller than the subtraction result "P−a". When the current measured value is not smaller than the subtraction result "P−a", the program advances from the step S5 to a step S6. On the other hand, when the current measured value is smaller than the subtraction result "P−a", the step S5 detects which of the two sides of a peak the focus position corresponding to the current search value exists in. The step S5 stores information representing the result of the current detection into the RAM 11*c*. Then, the step S5 retrieves information representing the results of the previous detections from the RAM 11*c*. The step S5 refers to the results of the current and previous detections; and thereby determines whether or not a value smaller than the subtraction result "P−a" has been measured at each of the two sides of a peak. When a value smaller than the subtraction result "P−a" has been measured at each of the two sides of a peak, the program advances from the step S5 to a step S8. Otherwise, the program advances from the step S5 to the step S6.

Figure 5:
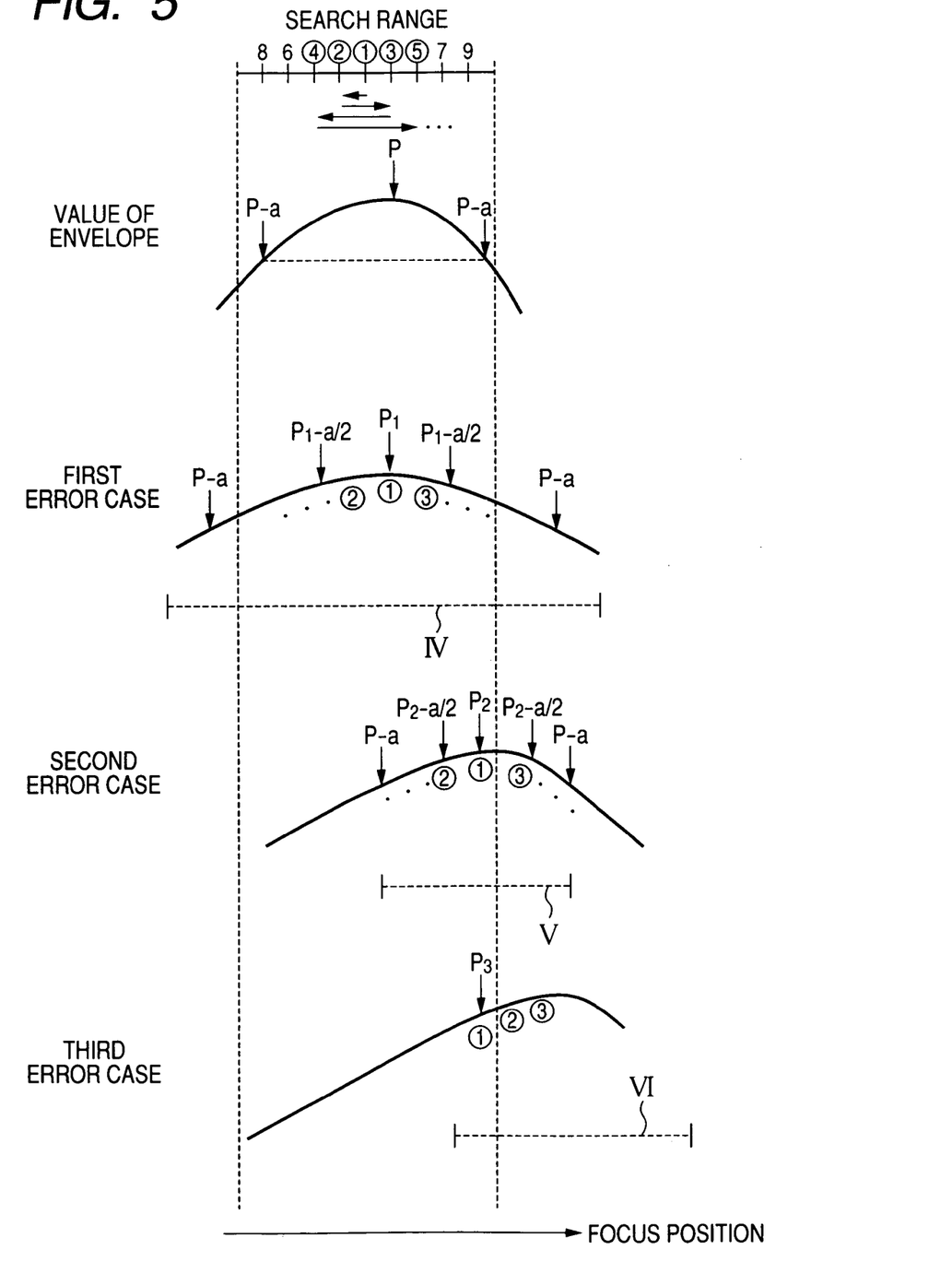
FIG. 5 is a diagram showing examples of the relation between the measured value of the envelope of a reproduced signal and the defocusing degree (the position of an objective lens in the axial direction).

With reference to FIG. 5, the value of the envelope varies along a solid curve as the focus position (the defocusing degree, the search value, or the position of the objective lens in the axial direction) changes. At first, the measured value of the envelope is obtained which corresponds to the point (the focus position, the defocusing degree, or the axial-direction position of the objective lens) ① centered in the search range. Normally, this measured value is greater than the subtraction result "P−a". Therefore, in this case, the program advances from the step S5 to the step S6.

The step S6 decides whether or not the focus position (the defocusing degree or the axial-direction position of the objective lens) has been moved throughout the search range. In other words, the step S6 decides whether or not the whole of the search range has been scanned. When the focus position degree has been moved throughout the search range, that is, when the whole of the search range has been scanned, the program advances from the step S6 to a step S9. Otherwise, the program advances from the step S6 to a step S7.

The step S7 increments the search value by "1". The step S7 generates the focusing vibration signal in accordance with the incremented search value and the measurement sampling order, and feeds the generated focusing vibration signal to the weight 5. The step S7 updates the variable indicative of the focus position in response to the search value and the measurement sampling order. After the step S7, the program returns to the step S2 and then reaches the step S5 again.

The initial measurement sampling order, and the relation of the search value with the focusing vibration signal (the focus position, the defocusing degree, or the axial-direction position of the objective lens) are designed to implement the following actions. Each time the search value is incremented, the position of the objective lens is moved in a direction along the optical axis which is opposite to the direction of the immediately-preceding movement. Furthermore, the amount of the movement is greater than that of the immediately-preceding movement.

With reference to FIG. 5, the axial-direction position of the objective lens (the defocusing degree) is changed as a measurement sampling order of ①→②→③→④→⑤ . . . while the search value is repetitively incremented. For the search value corresponding to the point ②, the measured value of the envelope is greater than the subtraction result "P−a". Therefore, in this case, the program advances from the step S5 to the step S6. For the search value corresponding to the point ③, the measured value of the envelope is greater than the subtraction result "P−a". Therefore, in this case, the program advances from the step S5 to the step S6.

When the step S5 decides that a value smaller than the subtraction result "P−a" has been measured at each of the two sides of a peak, the program advances from the step S5 to the step S8. The step S8 labels the measured peak value as a formal peak value P occurring at a position within the search range (see FIG. 5). The formal peak value P corresponds to the minimum jitter on the characteristic curve I in FIG. 2 which occurs at the defocusing degree (the focus position or the axial-direction position of the objective lens) in the search range T1 of FIG. 2. The step S8 regards the search value or the focus position, at which the formal peak value P is obtained, as an indication of an optimum position of the objective lens in the axial direction. After the step S8, the current execution cycle of the program segment ends.

The previously-mentioned first focusing optimizer is implemented by the execution of the program segment up to the step S8 without the advance from the step S6 to the step S9.

In the case where the optical disc 1 meets values (a disc thickness, a refractive index, a jitter, and an error rate) prescribed by at least important portions of the DVD standards, the program finally reaches the step S8 without advancing from the step S6 to the step S9. On the other hand, in the case where the optical disc 1 does not meet values (a disc thickness, a refractive index, a jitter, and an error rate) prescribed by important portions of the DVD standards, the program advances from the step S6 to the step S9 without reaching the step S8.

The step S9 concludes that an error occurs. After the step S9, the program advances to a step S11 in FIG. 4.

The step S11 analyzes the measured values and the search values (the focus position, the defocusing degrees, or the axial-direction positions of the objective lens).

A step S12 following the step S11 updates the search range and the measurement sampling order into harmony with the previously-mentioned second focusing optimizer on the basis of the results of the analyzation by the step S11. The step S12 sets the search value and the focus position to initial values (start values) for the second focusing optimizer. Then, the step S12 generates the focusing vibration signal in response to the search value, and feeds the generated focusing vibration signal to the weight 5. After the step S12, the program returns to the step S2 in FIG. 3. The return of the program to the step S2 starts implementing the second focusing optimizer.

The details of the steps S11 and S12 in FIG. 4 are as follows. There are first, second, and third error cases causing the program from advancing from the step S6 to the step S9.

As shown in FIG. 5, in the first error case, a measured value smaller than the subtraction result "P–a" fails to be obtained at each of the two sides of a peak in the search range used by the first focusing optimizer although a peak value P1 is obtained at a position within the search range.

As shown in FIG. 5, in the second error case, a measured value smaller than the subtraction result "P–a" fails to be obtained at one side of a peak in the search range used by the first focusing optimizer although a measured value smaller than the subtraction result "P–a" is obtained at the other side of a peak in the search range and also a peak value P2 is obtained at a position within the search range.

As shown in FIG. 5, in the third error case, a position corresponding to a peak value is absent from the search range used by the first focusing optimizer, and a measured value substantially linearly varies as the focus position (the defocusing degree or the axial-direction position of the objective lens) moves in the search range. A maximum measured value P3 occurs at one of the ends of the search range while a minimum measured value occurs at the other end of the search range.

The step S11 detects the relation between the measured values and the search values (the focus positions, the defocusing degrees, or the axial-direction positions of the objective lens). The step S11 determines which of the first, second, and third error cases the error detected by the step S9 fits on the basis of the detected relation.

The step S12 sets the search range, the measurement sampling order, the search value, and the variable indicative of the focus position on the basis of the result of the determination by the step S11 as to which of the first, second, and third error cases the detected error fits.

When it is determined that the detected error fits the first error case, the step S12 expands the search range as denoted by IV in FIG. 5. In the expanded search range, a measured value smaller than the subtraction result "P–a" can be obtained at each of the two sides of a peak. Specifically, the step S12 decides the expanded search range on the basis of a value corresponding to the difference (or the ratio) between the measured value "P–x" and the target value "P–a". The step S12 centers the expanded search range at the position (the search value) corresponding to the peak value P1. The step S12 replaces the original search range by the expanded search range. The step S12 sets an initial search value to the search value corresponding to the peak value P1. The step S12 updates the variable indicative of the focus position in accordance with the initial search value. The step S12 sets the measurement sampling order similar to that used in the first focusing optimizer.

When it is determined that the detected error fits the second error case, the step S12 shifts the search range as denoted by V in FIG. 5. In the shifted search range, a measured value smaller than the subtraction result "P–a" can be obtained at each of the two sides of a peak. Specifically, the step S12 shifts the search range so that the position (the search value) corresponding to the peak value P2 will be centered in the shifted search range. The step S12 may calculate a slope of the variation in the measured value with respect to the focus position (the defocusing degree or the axial-direction position of the objective lens). In this case, when the calculated slope at a position near the position corresponding to the peak value P2 is equal to or smaller than a prescribed value, the step S12 implements the shift of the search range. The step S12 replaces the original search range by the shifted search range. The step S12 sets an initial search value to the search value corresponding to the peak value P2. The step S12 updates the variable indicative of the focus position in accordance with the initial search value. The step S12 sets the measurement sampling order similar to that used in the first focusing optimizer.

When it is determined that the detected error fits the third error case, the step S12 shifts and expands the search range as denoted by VI in FIG. 5. Specifically, the shifted and expanded search range extends from the position corresponding to the maximum measured value P3 in a direction away from the before-shift search range (the original search range). The step S12 replaces the original search range by the shifted and expanded search range. The step S12 sets an initial search value to the search value corresponding to the maximum measured value P3. The step S12 updates the variable indicative of the focus position in accordance with the initial search value. The step S12 sets the measurement sampling order so that the focus position (the defocusing degree or the axial-direction position of the objective lens) will move from one end (a first end) of the shifted and expanded search range to the other end (a second end) thereof along one direction. The first end corresponds to the maximum measured value P3.

Thereafter, the step S12 generates the focusing vibration signal in response to the search value, and feeds the generated focusing vibration signal to the weight 5. After the step S12, the program returns to the step S2 so that the second focusing optimizer starts operating.

During the operation of the second focusing optimizer, the step S8 obtains a formal peak value corresponding to a minimum jitter. The step S8 regards the search value or the focus position, at which the formal peak value is obtained, as an indication of an optimum position of the objective lens in the axial direction.

As previously mentioned, the first focusing optimizer or the second focusing optimizer decides an optimum position of the objective lens in the axial direction for the optical disc 1. The decided optimum axial-direction position of the objective lens is used in later drive of the optical disc 1. In this way, the focusing servo is optimized. Specifically, the focusing servo circuit within the block 9 is optimized by the microcomputer 11 through the use of the decided optimum axial-direction position of the objective lens.

In the case where the optical disc 1 does not meet values (a disc thickness, a refractive index, a jitter, and an error rate) prescribed by important portions of the DVD standards, the measured jitter of the signal RF (or the EFM signal) occurring in the presence of the focusing vibration signal fed to the weight 5 takes a characteristic curve II or III in FIG. 2 or the value of the envelope of the reproduced signal RF (or the EFM signal) varies along the solid curve in one of the first, second, and third error cases of FIG. 5 as the focus position (the defocusing degree, the search value, or the axial-direction position of the objective lens) changes. In this case, the search range is expanded or shifted, and the second focusing optimizer uses the expanded or shifted search range and optimizes the focusing servo circuit. The optimization of the focusing servo circuit enables video data or audio data to be normally reproduced from the optical disc 1.

On the other hand, the first focusing optimizer can optimize the focusing servo circuit in a short time for the optical disc 1 which meets values (a disc thickness, a refractive index, a jitter, and an error rate) prescribed by at least important portions of the DVD standards. Therefore, it is possible to promptly reproduce video data or audio data from the optical disc 1.

The microcomputer 11 may implement and operate the second focusing optimizer in response to user's instruction inputted via the input device 15. For example, in the case where a normal reproduced picture continues to be unavailable for a long time interval from the moment of inputting a playback request into the apparatus of FIG. 1, the user operates the input device 15 to input an instruction for implementing and operating the second focusing optimizer. In this case, the microcomputer 11 implements and operates the second focusing optimizer in response to the inputted instruction.

The first, second, and third error cases may include an error case where the measured jitter of the reproduced signal RF (or the EFM signal) remains above a prescribed value, for example, 8%. The measured jitter is previously-mentioned calculated one. The measured jitter may be equal to a mean value of amplitude errors sampled at PLL clock timings.

Preferably, the tracking servo is optimized in a way similar to the previously-mentioned optimization of the focusing servo. The optimization of the reproducing device so as to maximize the amplitude of the reproduced signal RF is performed similarly to the previously-mentioned optimization of the focusing servo.

One of the first and second focusing optimizers, corresponding first and second tracking optimizers, corresponding first and second reproducing-device optimizers performs a readjustment for optimizing at least one of factors of the servo control. Specifically, one of the optimizers performs a readjustment for optimizing at least one of an offset, a gain, and a balance about the focusing servo circuit, an offset, a gain, and a balance about the tracking servo circuit, a frequency response, a response characteristic, and a gain characteristic of the reproducing device. When the first focusing optimizer fails to attain optimization, the second focusing optimizer changes the search range used by the first focusing optimizer and tries to attain optimization. When the first tracking optimizer fails to attain optimization, the second tracking optimizer changes the search range used by the first tracking optimizer and tries to attain optimization. When the first reproducing-device optimizer fails to attain optimization, the second reproducing-device optimizer changes the search range used by the first reproducing-device optimizer and tries to attain optimization.

The second focusing optimizer, the second tracking optimizer, and the second reproducing-device optimizer respond to initial values of variables or parameters which are set at suitable steps. For example, the second focusing optimizer responds to the initial values set by the step S12. Regarding the setting of the initial values, the user can select at least one from the parameters as mentioned below.

Figures 6, 7:
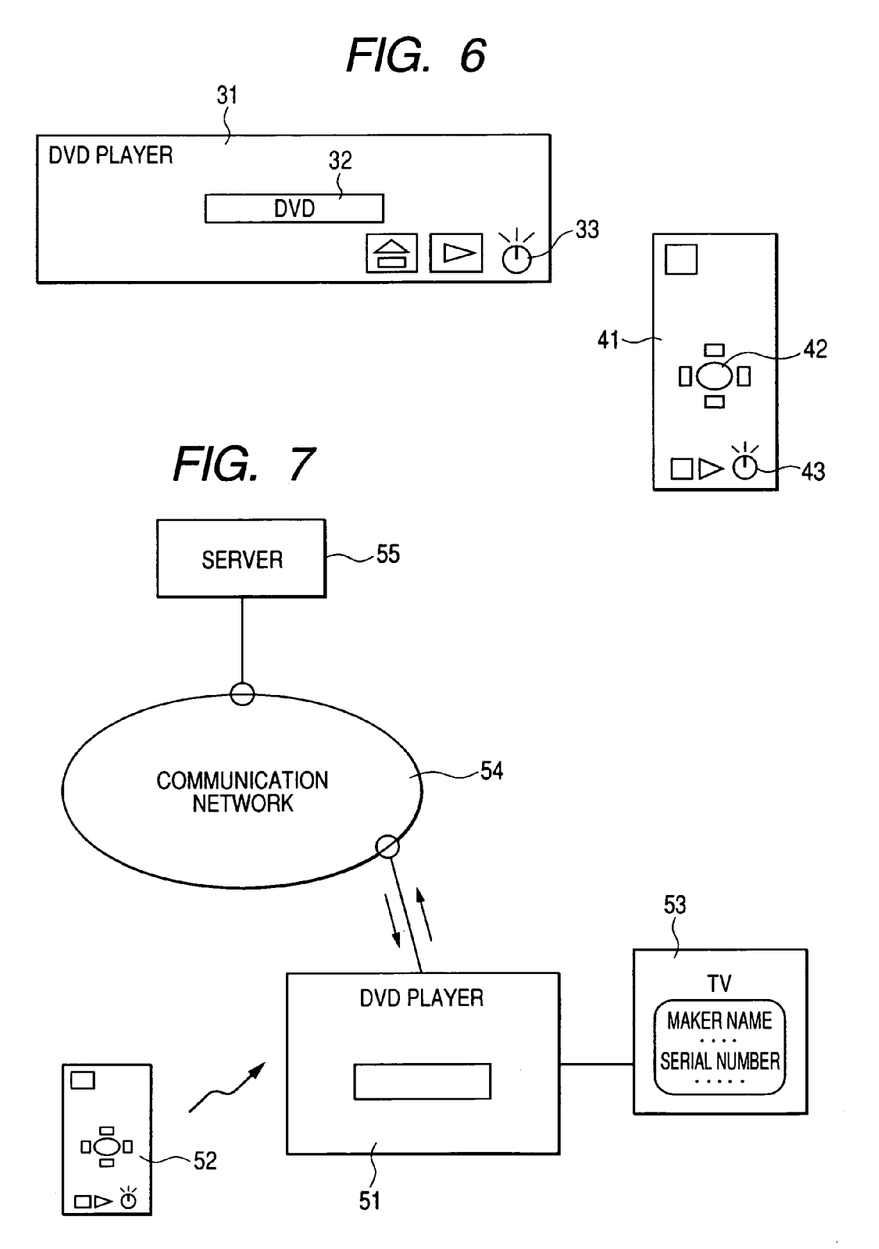
FIG. 6 is a diagram of a DVD player and a remote control device.
FIG. 7 is a diagram of a system according to a second embodiment of this invention.

With reference to FIG. 6, a DVD player 31 includes the apparatus of FIG. 1. The DVD player 31 has a body provided with an DVD insertion/ejection opening 32 and a playback mode selection switch 33. There is a remote control device 41 which can communicate with the body of the DVD player 31. The remote control device 41 has various operation keys 42 and a playback mode selection switch 43. When the playback mode selection switch 33 or 43 is actuated by the user, the microcomputer 11 in the body of the DVD player 31 changes the operation of the DVD player 31 to a playback mode (a reproducing mode). The playback mode is one among, for example, "focusing optimization", "tracking optimization", and "reproducing-device optimization". Thus, parameters for the playback mode are, for example, "focusing optimization", "tracking optimization", and "reproducing-device optimization".

The user can randomly and freely select at least one from the parameters for the second focusing optimizer, the second tracking optimizer, and the second reproducing-device optimizer, and can randomly and freely select one from the playback modes while referring to information about the quality of the optical disc 1 as a reference. The information about the quality of the optical disc 1 indicates the country making the disc 1, the maker of the disc 1, the year and date of the production of the disc 1, the factory making the disc 1, and the label of the disc 1.

Optical-disc quality conditions such as "flawed", "eccentric", and "surface curved" may be used as parameters in setting a playback mode or selecting one from playback modes. In this case, the user visually detects the quality condition of the optical disc 1 and selects one from the playback modes in accordance with the detected quality condition. The user can freely set the playback mode or freely select one from the playback modes.

When the playback mode corresponding to "focusing optimization" is selected and set, the microcomputer 11 shifts or expands the search range for focusing optimization and searches for an optimum point in the previously-mentioned way (see FIGS. 2-5). In addition, the microcomputer 11 performs a loop gain adjustment with respect to the focusing servo circuit in a known way so as to optimize the focusing servo gain.

When the playback mode corresponding to "tracking optimization" is selected and set, the microcomputer 11 searches for an optimum tracking point in a way similar to the above-mentioned search for the optimum focusing point.

When the playback mode corresponding to "reproducing-device optimization" is selected and set, the microcomputer 11 performs an adjustment with respect to the characteristics of an equalizer in the reproducing device. The adjustment includes changing a pass band (frequency band) for the reproduced signal RF, and controlling the amount of the boost of high-frequency signal components. Specifically, a gain concerning a frequency band at and near the highest signal frequency (the frequency of a 3T signal) is increased by about 0 to about 10 dB, and the pass band for the reproduced signal RF is changed. Under these conditions, the microcomputer 11 operates to find a point at which the measured jitter is minimized or the detected reproduced-signal amplitude is maximized.

When the playback mode corresponding to "flawed" is selected and set, the microcomputer 11 reduces the loop gain of the focusing servo circuit from the optimum value by, for example, 3 dB. Alternatively, the microcomputer 11 may reduce the loop gain of the tracking servo circuit from the optimum value by, for example, 3 dB. The microcomputer 11 may perform both the reductions of the loop gains of the focusing servo circuit and the tracking servo circuit.

When the playback mode corresponding to "eccentric" is selected and set, the microcomputer 11 increases the loop gain of the tracking servo circuit from the optimum value by, for example, 3 dB.

When the playback mode corresponding to "surface curved" is selected and set, the microcomputer 11 increases the loop gain of the focusing servo circuit from the optimum value by, for example, 3 dB.

The setting and selection of the playback mode and the parameter concerning the second focusing optimizer, the second tracking optimizer, and the second reproducing-device optimizer may be responsive to specified information other than user's instruction. In this case, the apparatus of FIG. 1 reproduces, from the optical disc 1, an information piece indicating the manufacturer of the disc 1, an information piece indicating the designing of the disc 1, an information piece indicating the production of the disc 1, an information piece indicating the physical characteristics of the disc 1, an information piece indicating the year and date of the production of the disc 1, and an information piece indicating the domain or country where the disc 1 is made. At least one of these information pieces is used in setting and selecting the playback mode and the parameter concerning the second focusing optimizer, the second tracking optimizer, and the second reproducing-device optimizer. For example, at least one of the information pieces is used in deciding the search range used by the second focusing optimizer, the second tracking optimizer, or the second reproducing-device optimizer. Specifically, parameters for the second focusing optimizer, the second tracking optimizer, and the second reproducing-device optimizer are previously stored in the apparatus of FIG. 1 (for example, the ROM 11d) as a table where the parameters are related with the information pieces. The microcomputer 11 retrieves the parameter or parameters corresponding to the used information piece or pieces from the table, and operates to perform the optimization in response to the retrieved parameter or parameters.

Generally, the quality of the optical disc 1 (for example, the unevenness in thickness of the optical disc 1) tends to depend on the country making the disc 1 and the year and date of the production of the disc 1. Reference data indicating the dependence of the quality of an optical disc on the country making the disc and the year and date of the production of the disc is previously stored in the apparatus of FIG. 1 (for example, the ROM 11d). The microcomputer 11 derives the country making the disc 1 and the year and date of the production of the disc 1 from the information pieces reproduced from the disc 1. By referring to the reference data, the microcomputer 11 decides whether the unevenness in thickness of the optical disc 1 is acceptable or unacceptable on the basis of the derived country making the disc 1 and the derived year and date of the production of the disc 1. When it is decided that the unevenness in thickness of the optical disc 1 is unacceptable, the microcomputer 11 changes the search range and performs an adjustment for optimization through the use of the changed search range.

Generally, the quality of an optical disc depends on the manufacturer thereof. Reference data indicating the dependence of the quality of an optical disc on the manufacturer thereof is previously stored in the apparatus of FIG. 1 (for example, the ROM 11d). The microcomputer 11 derives the manufacturer of the optical disc 1 from the information piece reproduced therefrom. By referring to the reference data, the microcomputer 11 may change the search range in accordance with the derived manufacturer of the disc 1 and perform an adjustment for optimization through the use of the changed search range. There is an optical disc having a prescribed area previously loaded with an information piece indicating the designing of the disc, an information piece indicating the manufacture of the disc, and an information piece indicating the physical characteristics of the disc. The apparatus of FIG. 1 reproduces these information pieces from the prescribed area of the optical disc 1, and performs the playback while using the parameters for the servo and the signal processing on the basis of the reproduced information pieces.

There is an optical disc having a lead-in area previously loaded with an information piece indicating the manufacturer of the disc, an information piece indicating the designing of the disc, an information piece indicating the manufacture of the disc, an information piece indicating the physical characteristics of the disc, an information piece indicating the year and date of the production of the disc, and an information piece indicating the domain or country where the disc is made. In the case of a DVD-RAM or an HD-DVD, the recording density in the lead-in area is lower than that in the data area. Generally, a lower recording density causes easier reproduction of data from a related area. Thus, the above-mentioned information pieces can be reproduced from the lead-in area of a DVD-RAM or an HD-DVD even in the event that data can not be reproduced from the data area thereof. Thus, in this case, the previously-mentioned optimization can be implemented through the use of at least one of the reproduced information pieces. As a result of the implementation of the optimization, contents data can be reproduced from the data area.

A recordable optical disc has a prescribed area loaded with an information piece indicating the history of recordings (the number of times of overwriting), an information piece indicating a recording format, an information piece indicating apparatuses performing respective recordings and disc places subjected to the respective recordings, an information piece indicating the date and time of every recording, an information piece indicating the physical characteristics of the disc (the physical characteristics of a recording film in the disc), an information piece indicating a recording laser power and an erasing laser power, an information piece indicating a domain where every recording is performed, and an information piece indicating recording conditions (the wavelength of a recording laser beam, a numerical aperture NA of an objective lens, a recording laser power, an erasing laser power, and an atmospheric temperature at the time of recording). The apparatus of FIG. 1 reproduces these information pieces from the prescribed area of the optical disc 1. The microcomputer 11 operates to perform the optimization by the second focusing optimizer, the second tracking optimizer, or the second reproducing-device optimizer in response to at least one of the reproduced information pieces. Specifically, the microcomputer 11 decides the search range in accordance with at least one of the reproduced information pieces.

SECOND EMBODIMENT

FIG. 7 shows a system according to a second embodiment of this invention. The system of FIG. 7 includes a DVD player 51 having the apparatus of FIG. 1. The DVD player 51 can be operated by a remote control device 52. The DVD player 51 reproduces information from a DVD. The DVD player 51 feeds the reproduced information to a television apparatus 53.

The television apparatus 53 indicates pictures represented by the reproduced information. The DVD player 51 and a server 55 can communicate with each other on a bidirectional basis through a communication network 54 such as the Internet. The communication network 54 corresponds to the communication network 17 in FIG. 1.

A user inputs, into the DVD player 51, information representative of the maker name, the production number, the serial number, the lot number, and the country of the production of the DVD through a GUI (graphical user interface) connected to the television apparatus 53 and the DVD player 51. The DVD player 51 generates inquiry information inclusive of the inputted information. The DVD player 51 sends the generated inquiry information to the server 55 via the communication network 54.

When receiving the inquiry information, the server 55 obtains adjustment information suited for the DVD player 51 and corresponding to the received inquiry information. The server 55 returns the obtained adjustment information to the DVD player 51 via the communication network 54.

The DVD player 51 receives the adjustment information from the server 55 as a response to the inquiry information. The DVD player 51 performs the optimization by the second focusing optimizer, the second tracking optimizer, or the second reproducing-device optimizer in response to the received adjustment information. Specifically, the DVD player 51 decides the search area used by the second focusing optimizer, the second tracking optimizer, or the second reproducing-device optimizer in accordance with the received adjustment information.

THIRD EMBODIMENT

A third embodiment of this invention is similar to the first or second embodiment thereof except that a removable magnetic recording medium, a removable hologram memory, or a removable semiconductor memory replaces the optical disc 1 or the DVD handled by the DVD player 51.

What is claimed is:

1. A method of reproducing an information signal from a removable recording medium by using a pickup device, comprising the steps of:
    searching one of (1) a reproduced signal reproduced from the recording medium by the pickup device and (2) control information related to the reproduced signal in a first search range for first information;
    detecting an optimum condition of a reproducing operation of the pickup device with respect to the recording medium on the basis of the first information;
    deciding whether or not detecting an optimum condition of the reproducing operation of the pickup device with respect to the recording medium on the basis of the first information has been successful;
    searching one of (1) the reproduced signal and (2) the control information related to the reproduced signal in a second search range different from the first search range for second information in cases where it is decided that detecting an optimum condition of the reproducing operation of the pickup device with respect to the recording medium on the basis of the first information has not been successful; and
    detecting an optimum condition of the reproducing operation of the pickup device with respect to the recording medium on the basis of the second information;
    wherein the second information corresponds to at least one arbitrarily selected from predetermined parameters.

2. A method of reproducing an information signal from a removable recording medium by using a pickup device, comprising the steps of:
    searching one of (1) a reproduced signal reproduced from the recording medium by the pickup device and (2) control information related to the reproduced signal in a first search range for first information;
    detecting an optimum condition of a reproducing operation of the pickup device with respect to the recording medium on the basis of the first information;
    deciding whether or not detecting an optimum condition of the reproducing operation of the pickup device with respect to the recording medium on the basis of the first information has been successful;
    searching one of (1) the reproduced signal and (2) the control information related to the reproduced signal in a second search range different from the first search range for second information in cases where it is decided that detecting an optimum condition of the reproducing operation of the pickup device with respect to the recording medium on the basis of the first information has not been successful;
    detecting an optimum condition of the reproducing operation of the pickup device with respect to the recording medium on the basis of the second information;
    reproducing from the recording medium an information piece representing a manufacturer of the recording medium, an information piece representing the designing of the recording medium, an information piece representing physical characteristics of the recording medium, an information piece representing a date of production of the recording medium, and an information piece representing a domain where the recording medium is made; and
    deciding the second search range on the basis of at least one of the information pieces reproduced from the recording medium.

3. A method of reproducing an information signal from a removable recording medium by using a pickup device, comprising the steps of:
    searching one of (1) a reproduced signal reproduced from the recording medium by the pickup device and (2) control information related to the reproduced signal in a first search range for first information;
    detecting an optimum condition of a reproducing operation of the pickup device with respect to the recording medium on the basis of the first information;
    deciding whether or not detecting an optimum condition of the reproducing operation of the pickup device with respect to the recording medium on the basis of the first information has been successful;
    searching one of (1) the reproduced signal and (2) the control information related to the reproduced signal in a second search range different from the first search range for second information in cases where it is decided that detecting an optimum condition of the reproducing operation of the pickup device with respect to the recording medium on the basis of the first information has not been successful;
    detecting an optimum condition of the reproducing operation of the pickup device with respect to the recording medium on the basis of the second information;
    reproducing from the recording medium an information piece representing a history of recording with respect to the recording medium, an information piece representing a recording format, an information piece representing a recording apparatus, an information piece representing a date of recording, an information piece representing physical characteristics of the recording medium, an information piece representing a domain where recording is done, and an information piece representing conditions of recording; and deciding the second search range on the basis of at least one of the information pieces reproduced from the recording medium.

4. A method of reproducing an information signal from a removable recording medium by using a pickup device, comprising the steps of:

searching one of (1) a reproduced signal reproduced from the recording medium by the pickup device and (2) control information related to the reproduced signal in a first search range for first information;

detecting an optimum condition of a reproducing operation of the pickup device with respect to the recording medium on the basis of the first information;

deciding whether or not detecting an optimum condition of the reproducing operation of the pickup device with respect to the recording medium on the basis of the first information has been successful;

searching one of (1) the reproduced signal and (2) the control information related to the reproduced signal in a second search range different from the first search range for second information in cases where it is decided that detecting an optimum condition of the reproducing operation of the pickup device with respect to the recording medium on the basis of the first information has not been successful;

detecting an optimum condition of the reproducing operation of the pickup device with respect to the recording medium on the basis of the second information;

sending an information request signal to a server via a communication line;

receiving third information from the server via the communication line as a response to the information request signal, the third information relating to signal reproduction from the recording medium; and deciding the second search range on the basis of the received third information.

5. An apparatus for reproducing an information signal from a removable recording medium by using a pickup device, comprising:

means for searching one of (1) a reproduced signal reproduced from the recording medium by the pickup device and (2) control information related to the reproduced signal in a first search range for first information;

means for detecting an optimum condition of a reproducing operation of the pickup device with respect to the recording medium on the basis of the first information;

means for deciding whether or not detecting an optimum condition of the reproducing operation of the pickup device with respect to the recording medium on the basis of the first information has been successful;

means for searching one of (1) the reproduced signal and (2) the control information related to the reproduced signal in a second search range different from the first search range for second information in cases where it is decided that detecting an optimum condition of the reproducing operation of the pickup device with respect to the recording medium on the basis of the first information has not been successful ; and means for detecting an optimum condition of the reproducing operation of the pickup device with respect to the recording medium on the basis of the second information;

wherein the second information corresponds to at least one arbitrarily selected from predetermined parameters.

6. An apparatus for reproducing an information signal from a removable recording medium by using a pickup device, comprising:

means for searching one of (1) a reproduced signal reproduced from the recording medium by the pickup device and (2) control information related to the reproduced signal in a first search range for first information;

means for detecting an optimum condition of a reproducing operation of the pickup device with respect to the recording medium on the basis of the first information;

means for deciding whether or not detecting an optimum condition of the reproducing operation of the pickup device with respect to the recording medium on the basis of the first information has been successful;

means for searching one of (1) the reproduced signal and (2) the control information related to the reproduced signal in a second search range different from the first search range for second information in cases where it is decided that detecting an optimum condition of the reproducing operation of the pickup device with respect to the recording medium on the basis of the first information has not been successful;

means for detecting an optimum condition of the reproducing operation of the pickup device with respect to the recording medium on the basis of the second information;

means for reproducing from the recording medium an information piece representing a manufacturer of the recording medium, an information piece representing the designing of the recording medium, an information piece representing physical characteristics of the recording medium, an information piece representing a date of production of the recording medium, and an information piece representing a domain where the recording medium is made; and means for deciding the second search range on the basis of at least one of the information pieces reproduced from the recording medium.

7. An apparatus for reproducing an information signal from a removable recording medium by using a pickup device, comprising;

means for searching one of (1) a reproduced signal reproduced from the recording medium by the pickup device and (2) control information related to the reproduced signal in a first search range for first information;

means for detecting an optimum condition of a reproducing operation of the pickup device with respect to the recording medium on the basis of the first information;

means for deciding whether or not detecting an optimum condition of the reproducing operation of the pickup device with respect to the recording medium on the basis of the first information has been successful;

means for searching one of (1) the reproduced signal and (2) the control information related to the reproduced signal in a second search range different from the first search range for second information in cases where it is decided that detecting an optimum condition of the reproducing operation of the pickup device with respect to the recording medium on the basis of the first information has not been successful;

means for detecting an optimum condition of the reproducing operation of the pickup device with respect to the recording medium on the basis of the second information;

means for reproducing from the recording medium an information piece representing a history of recording with respect to the recording medium, an information piece representing a recording format, an information piece representing a recording apparatus, an information piece representing a date of recording, an information piece representing physical characteristics of the recording medium, an information piece representing a domain where recording is done, and an information piece representing conditions of recording; and means for deciding the second search range on the basis of at least one of the information pieces reproduced from the recording medium.

8. An apparatus for reproducing an information signal from a removable recording medium by using a pickup device, comprising:

means for searching one of (1) a reproduced signal reproduced from the recording medium by the pickup device and (2) control information related to the reproduced signal in a first search range for first information;

means for detecting an optimum condition of a reproducing operation of the pickup device with respect to the recording medium on the basis of the first information;

means for deciding whether or not detecting an optimum condition of the reproducing operation of the pickup device with respect to the recording medium on the basis of the first information has been successful;

means for searching one of (1) the reproduced signal and (2) the control information related to the reproduced signal in a second search range different from the first search range for second information in cases where it is decided that detecting an optimum condition of the reproducing operation of the pickup device with respect to the recording medium on the basis of the first information has not been successful;

means for detecting an optimum condition of the reproducing operation of the pickup device with respect to the recording medium on the basis of the second information;

means for sending an information request signal to a server via a communication line;

means for receiving third information from the server via the communication line as a response to the information request signal, the third information relating to signal reproduction from the recording medium; and means for deciding the second search range on the basis of the received third information.

* * * * *